June 23, 1942.  S. W. FERRIS  2,287,730
TREATMENT OF WAX
Filed Jan. 30, 1935   2 Sheets-Sheet 1

Fig. 1

Inventor
Seymour W. Ferris
By his Attorney

Fig. 2

Patented June 23, 1942

2,287,730

UNITED STATES PATENT OFFICE 2,287,730

TREATMENT OF WAX

Seymour W. Ferris, Aldan, Pa., assignor to The Atlantic Refining Company, Philadelphia, Pa., a corporation of Pennsylvania Application January 30, 1935, Serial No. 4,157

9 Claims. (Cl. 196—18)

The present invention relates to a process for the separation of solid or semi-solid waxy constituents from hydrocarbon oils and/or the separation of waxy constituents from one another, and relates more particularly to the separation of wax from petroleum crude oils, and distillates and residuums thereof.

A principal object of my invention is to effect a completeness of separation with an economy not heretofore attainable in the employment of conventional processes or combinations of processes for the separation of wax from oil.

A further object of my invention is to effect, by a single general procedure, varying degrees and kinds of separation of hydrocarbon oil-wax mixtures with a like economy. Thus, for example, I am able to separate from such mixtures, oils substantially free of wax or containing such definite amounts of wax as to render them desirable commercial products; to separate from given wax-bearing oils either one wax of specific physical properties, or a series of waxes, each of specific but different physical properties; to simultaneously produce an oil substantially free from, or containing a definite amount of wax, and a wax substantially free of oil; and finally, to produce from a given wax mixture, two or more waxes having properties different from each other and from the initial wax mixture.

My invention is characterized not only by the ability to accomplish in a single procedure, a degree of separation heretofore requiring a combination of processes, or the repetition of a single process, but also by its applicability to a greater variety of wax-bearing oils than any one of the conventional methods employed for separation purposes.

Light lubricating oils and paraffin waxes have been commonly produced from "paraffin distillate" by the well-known steps of chilling, pressing and sweating; and heavy lubricating oils and petrolatum stocks have been produced from residuums and heavy wax-bearing distillates by dilution with a solvent more volatile than the stock, chilling, separation of the solids and/or semi-solids by settling, centrifuging or filter pressing, and removal of the solvent by distillation. The crude petrolatum stocks so separated contain considerable quantities of oil which cannot be separated by sweating. The normal procedure for the further separation of oil from such stocks, comparatively ineffective and rarely practiced because of its high cost, has been a repetition of the process employed on the original stock. Intermediate between these two types of wax-bearing stocks are others medium in viscosity and boiling range, which are not amenable to treatment by either of the procedures described. My process is applicable to substantially the entire range of wax-bearing oils and I am able to effect not only the primary separation of the oil and wax, but also, if desirable, a fractionation of the wax.

The processes for the separation of wax and oil commonly employed in the petroleum industry all result in an initial separation of a wax contaminated with relatively large percentages of oil. The "slack wax" obtained by filter pressing chilled paraffin distillate usually contains from 25% to 55% of oil; and the crude petrolatum stocks obtained by centrifuging or cold settling naphtha diluted motor oil stocks, cylinder stocks or crude residuums all contain upwards of 25% of oil. The same is true of the wax cakes obtained by the filter pressing methods employed in removing the precipitated wax from the diluted oil solutions in the more recent processes employing propane, mixtures of benzol and acetone and other diluents. While the waxes from paraffin distillate may be freed of oil by the well-known sweating process, the petrolatum stocks and filter press cakes from stocks other than paraffin distillate can only be rendered oil-free by elaborate procedures not generally practiced because of the disparity between the cost of such methods and the commercial value of the wax produced.

I have found that, contrary to general belief and statements in the literature, the wax precipitated by chilling wax-bearing hydrocarbon oils, either as such or in dilution in various solvents, is in itself pure wax containing no oil, and I have further discovered a general procedure and modifications thereof, described hereinafter, whereby the oil adhering to the surfaces of the individual wax crystals or contained in the interstices between the crystals may be either removed substantially completely or to an extent not hitherto practically and economically possible, by a displacing and washing operation following the crystallization of the wax from the mother liquor, i. e., from the original or the diluted hydrocarbon oil.

Herein, the term "crystalline wax," when employed, is to be understood to include any and all types of solid and/or semi-solid waxy hydrocarbons, whether of distinctly crystalline type or of the so-called amorphous or mal-crystalline type. Such term is to be understood to include, for example, waxy materials obtainable from paraffin distillates, intermediate distillates, high viscosity distillates and/or residuums.

Briefly, the several steps of my process are:

(1) The preparation by any known method, for example by distillation or by blending, of a wax-bearing stock of such relative concentration of oil and wax that upon being cooled to the desired separating temperature, wax will crystallize in a quantity not more than substantially 10% by volume of the oil-wax mixture, or by dilution of a given wax-bearing stock with any suitable solvent, so that upon cooling to the desired separating temperature, not more than 10% by volume of wax will crystallize.

(2) The cooling of the stock or diluted stock to the desired separation temperature, with or without agitation, in such a manner as to effect a dispersion of the wax crystals thruout the mother liquor with reasonable uniformity. If agitation is resorted to, the cooled mother liquor containing the wax crystals is thereafter preferably permitted to stand, unagitated, for sufficient time to effect the formation of a highly porous wax mass, the structure of which has appreciable mechanical strength or cohesion, such mass containing not more than substantially 10% of crystalline wax per unit volume of the mass.

(3) The displacement of the mother liquor from the chilled wax mass by a displacing or washing liquid, preferably an oil solvent, without substantial agitation and under a low differential pressure, in such a manner that a substantially horizontal interface is maintained between the mother liquor and the washing liquid, with suitable gravity differential between the mother liquor and the washing liquid contributing substantially to the maintenance of such horizontal interface.

(4) The recovery of the wax, and the separation of the oil from the solvent and/or displacing liquid resulting from the third step of my process.

An important feature in the successful operation of my process and the various modifications thereof is the limitation of the volume occupied by the wax crystals in the wax mass during the removal of the mother liquor from such mass. To this end, careful adjustment of the concentration of wax in the mother liquor, the gravity differentials between wax, mother liquor and displacing liquid, and/or the differential pressures employed in the displacement, is expedient.

In carrying out my process, it is necessary to control the quantity of wax in the mother liquor so that the crystalline wax content of the mass resulting from the chilling of the mother liquor will not exceed substantially 10% of any unit volume of the mass at the beginning of the displacing operation. In most instances, it has been found that the crystalline wax contained in the wax mass at the beginning of the displacement step should be of the order of from 1% to 6% by volume, and preferably of the order of from 2.5% to 4.5% by volume; it may, however, be as high as substantially 10% by volume depending upon the character of the wax crystals, harder and larger crystals tending to permit higher wax concentrations. Should the crystalline wax content of the mass exceed substantially 10% by volume of said wax mass from which the mother liquor is to be displaced, the wax particles will be so compacted together that the passages between them filled with mother liquor will be too restricted to permit the displacement of mother liquor at the preferred low differential pressures. However, during the displacement and/or washing operation, some compacting of the wax crystals is to be expected, and at the completion of the said operation the concentration of crystalline wax in the washed wax mass may be of the order of 20% by volume, depending upon the degree of compacting caused by the displacement step. If the concentration of wax in the mass is so great as to render the mass too dense, it will be necessary to employ an undesirably high differential pressure to effect displacement of mother liquor from the mass, with the result that the displacing liquid will tend to flow more rapidly through any cracks or areas of low wax content than through the main body of the wax mass, thereby causing unequal displacement of the mother liquor and yielding a final wax product containing residual oil. By maintaining a low concentration of wax, the pressure required to cause the displacing liquid to pass through the wax mass is low; and when a wash liquid of different specific gravity than that of the mother liquor is used, the tendency of the displacing liquid to flow more rapidly through areas of low wax content is checked by the tendency of the mother liquor to maintain a substantially horizontal interface. Thus, when displacement is downward and the displacing liquid is of lower gravity than the mother liquor, if a vertical crack occurs, the displacing liquid tends to fill that fissure and thus extend a column of liquid below the interface. However, the heavier mother liquor, which must be forced from the fissure, resists the entrance of the displacing liquid and tends to force it back and maintain a substantially horizontal interface between the two liquids. Since the gravity differential between the two liquids is necessarily limited, this tendency to maintain a horizontal interface is effective only against relatively low displacing pressures. Hence, if the crystalline wax content of the mass is so great as to require high differential pressures, any cracks in the cake will become enlarged, gravity differentials between the liquids will lose their significance, the interface between the displacing liquid and the mother liquor will be disrupted, and washing of the wax mass will be incomplete. Furthermore, the compacting effect of high differential pressures is undesirable in that the rate of displacement and washing is materially reduced. However, in accordance with my invention, the employment of a relatively porous wax mass and relatively small differential pressures permits a reasonably rapid displacement of mother liquor and a very complete washing of residual liquor from the wax mass.

My invention is differentiated from known processes, particularly filter press operations, in that at no time during the removal of the mother liquor from the wax crystals is any part of the crystalline mass still containing appreciable quantities of mother liquor compacted to a crystalline wax concentration greater than 20 parts by volume, and that, in general, at no time does the differential pressure required in effecting displacement exceed substantially 5 lbs./sq. in. per unit (1 foot) depth of the wax mass, and usually at the outset does not exceed 2 lbs./sq. in. It is to be understood, however, that at some stage of the operation and particularly during the latter part thereof, the pressure may be somewhat in excess of 5 lbs./sq. in. In many instances, throughout the major portion of the displacing step, pressures are less than 2 lbs./sq. in. For example, if the displacing liquid be above the wax mass, in suitable apparatus, the static head of the displacing liquid (or less if the effluent liquid be taken through a throttle valve) is usually sufficient to carry out a major portion of the displacement.

On the contrary, in conventional filter press operations, the press cake contains of the order of from 50% to 75% of crystalline wax. Pressures required to effect washing in conventional filter press operation, are usually in excess of 30 lbs./sq. in. for a cake thickness of the order of from 1½ to 3 inches; and the resulting washed cakes contain upward of 25% of oil. It is characteristic of filter press operation that the compact nature of the wax cake formed offers such resistance to the flow of liquid therethrough as to necessitate the building up of a large number of thin cakes during filtering. My invention is further contrasted with such operation in that the extremely porous nature of the wax mass or body permits satisfactory and substantially complete removal of oil from a wax mass many times the thickness of the normal filter cake, so that in the process of my invention, a relatively small number of large masses of wax may be handled. While filter cakes are limited to thicknesses of the order of from 1½ to 3 inches, my process is applicable to wax masses, one foot or more, and preferably on the order of 5 feet or even greater, in depth.

My process may be further distinguished from conventional filter pressing in that both the main portion of the mother liquor and the residual portion normally remaining in the wax mass at the completion of the filtering step, may be removed substantially completely in one operation.

In accordance with my invention, a variety of solvents and displacing or washing liquids, or combinations thereof, may be employed. It is essential for the economical operation of my process, that the crystallizing liquid or mother liquor be prevented from admixing to substantial extent with the displacing or washing liquid. This may be accomplished, for the major part, by maintaining a sufficient gravity differential between the mother liquor and the displacing liquid. If the displacement of the mother liquor from the wax mass is to take place downwardly, it is preferable that the displacing liquid have a lower specific gravity than the mother liquor, whereas, if the displacement is to be effected upwardly, it is preferable that the displacing liquid have a higher specific gravity than the mother liquor. By maintaining a suitable gravity differential, properly coordinated with respect to the direction of flow during displacement, it is possible to obtain a substantially horizontal interface between the motor liquor and the displacing liquid. From the economical viewpoint, it is highly desirable to prevent substantial disruption of the interface, inasmuch as the admixing of mother liquor and displacing liquid would necessitate the employment of considerably more displacing or washing liquid to produce the desired degree of oil removal. Therefore it is necessary that no substantial agitation take place during the displacement or washing operation.

Furthermore, I find that my process may be operated most advantageously if the specific gravities of the wax, the mother liquor and the displacing liquid be substantially different. For example, if downward displacement is to be effected, it is desirable that the specific gravity of the mother liquor be highest and that of the displacing liquid be lowest, while the gravity of the wax be intermediate but preferably approaching that of the displacing liquid. In this instance, the relatively heavy mother liquor will exert a considerable buoyancy upon the crystals of the wax mass, thereby aiding in the maintenance of the uniformity and porosity of the wax mass. During the downward displacement and/or washing, if the gravity of the displacing liquid is less than that of the mother liquor, and less than but approaching that of the wax, there will be less tendency for the wax to settle or compact upon passage of the displacing liquid thru the wax mass, than if the displacing liquid were of markedly lower gravity than the wax, and at the same time a relatively uniform interface may be maintained between the displacing liquid and the mother liquor.

On the other hand, if upward displacement is to be effected, it is desirable that the specific gravity of the mother liquor be lowest and that of the displacing liquid be highest, while the gravity of the wax be intermediate, but preferably approaching that of the displacing liquid. In this case, the relatively light mother liquor will exert little buoyancy upon the crystals of the wax mass, thus permitting a certain degree of settling of the wax against the upward flow of heavy displacing liquid, thereby aiding in the maintenance of a porous wax mass. During upward displacement, if the gravity of the displacing liquid is greater than that of the mother liquor and greater than but approaching that of the wax, there will be less tendency for the wax to compact upwardly upon passage of the displacing liquid thru the wax mass than if the displacing liquid has a markedly greater gravity than that of the wax, and at the same time a relatively uniform interface may be maintained between the displacing liquid and the mother liquor.

When solvents are employed in making up the crystallizing solution or mother liquor, they may or may not be similar in character to the displacing and/or washing liquid. If the solvent and displacing liquid are the same, the gravity differential between the displacing liquid and the mother liquor will depend upon the quantity of wax-bearing stock admixed with the solvent to form the crystallizing solution or mother liquor. In the event that the solvent liquid and the displacing liquid are of dissimilar character, it is preferable that they have sufficiently different boiling points in order that separation of one from the other at the end of the operation may be readily effected, for example by distillation.

While I do not intend to confine myself to any one or several specific procedures for carrying out my process, the following examples will serve to illustrate the general principles of my invention.

Figure 1:
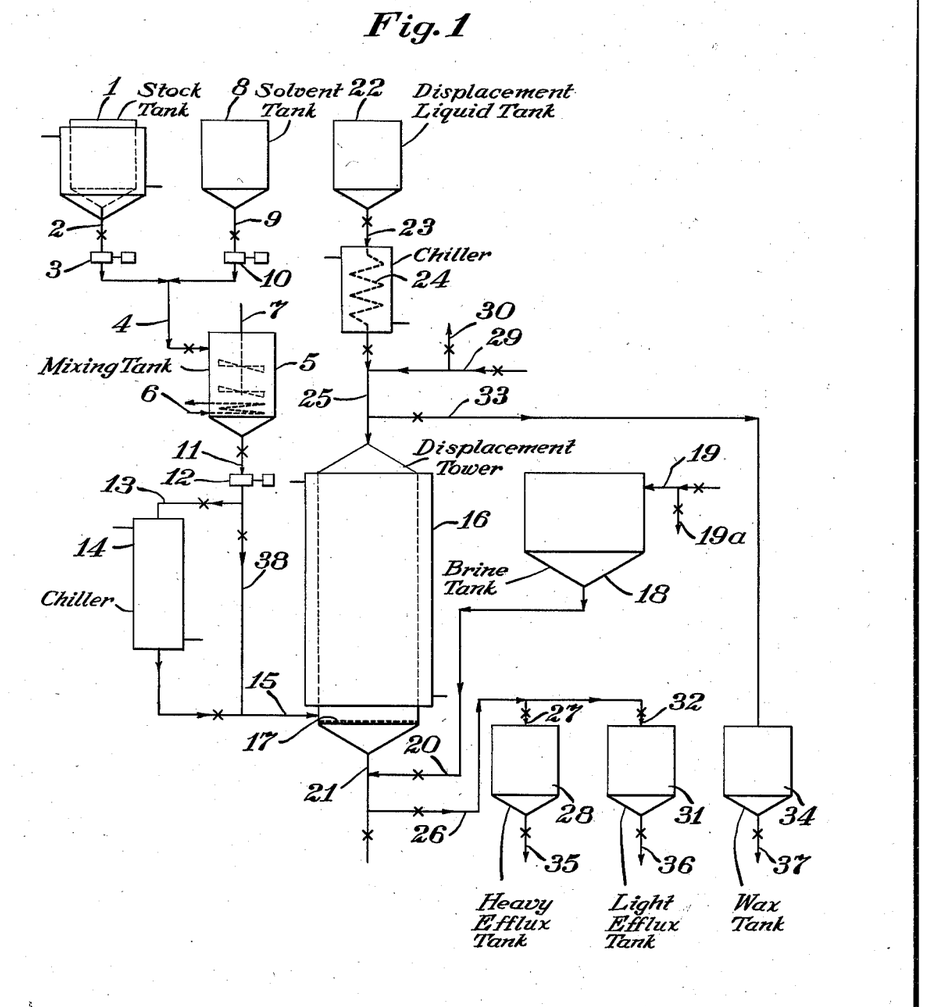

Referring to Fig. 1 of the drawings, which illustrates apparatus suitable for carrying out the separation of oil-wax mixtures by downward displacement:

From a steam jacketed stock tank 1, 40 parts, for example, of a wax bearing distillate from East Texas crude oil having a pour test of 125° F., and a Saybolt Universal viscosity of 60 seconds at 210° F., is withdrawn through valve-controlled pipe 2 and pumped by pump 3 through valve-controlled pipe 4 into a mixing tank 5 provided with heating coil 6 and stirrer 7. Simultaneously or subsequently 60 parts, for example, of ethylene dichloride is withdrawn from solvent tank 8 by means of valve-controlled pipe 9 and pumped by pump 10 through valve-controlled pipe 4 into mixing tank 5. Herein the solvent and distillate containing wax are agitated at a temperature of, for example, 120° F., until a homogeneous solution is obtained. The resulting solution is passed from the mixing tank 5 by means of valve-controlled pipe 11 and is pumped by pump 12 thru valve-controlled pipe 13 to chilling device 14, wherein the solution is cooled until the temperature is, for example, of the order of 85° F., and a portion of the wax has crystallized. This oil-wax-solvent mixture is passed from the chiller 14 by means of valve-controlled pipe 15 into the brine-jacketed displacement tower 16, above the screen 17. Prior to the introduction of the chilled mixture into the tower 16, air pressure is applied to brine tank 18 through valve-controlled pipe 19 provided with a valved vent 19a, and brine of a specific gravity greater than that of the chilled mixture, is forced through valve-controlled pipe 20 and pipe 21 into the conical lower section of tower 16 until it barely covers the screen 17. The brine and screen 17 thus support the chilled oil-wax-solvent mixture in the tower 16. The mixture contained in the displacement tower 16 is then cooled at a rate of, for example, 1° F. to 4° F. per hour, until the temperature of the mixture is of the order of, for example, 65° F., and the desired final quantity of wax has crystallized out. The cooling in the tower 16 may be effected by circulation of cold brine in the tower jacket and/or by the employment of brine coils or pipes (not shown) installed within the tower.

The mixture is preferably allowed to remain in a quiescent state within tower 16 during the final cooling period, in which time the wax crystals form an agglomerate mass of appreciable mechanical strength while still retaining a high degree of free space or porosity thruout which the mother liquor is distributed. At the completion of the cooling period, 100 parts of a displacing liquid, for example, naphtha of 50° A. P. I. gravity, is passed from the displacement liquid tank 22 through valve-controlled pipe 23, cooled to about 65° F. in cooling coil 24 and introduced into the displacement tower 16, by means of valve-controlled pipe 25, above the surface of the chilled oil-wax-solvent mixture contained therein. The displacing liquid is introduced in such a manner as to prevent substantial disturbance of the wax mass from which the oil and solvent are to be displaced. Preferably simultaneously with the introduction of the displacing liquid at the top of tower 16, brine is withdrawn from the bottom of said tower and returned to the brine tank 18 by means of valve-controlled pipe 20. Oil and solvent from the wax mass, displaced downwardly by the incoming displacing liquid, is withdrawn from the bottom of tower 16 and passed through valve-controlled pipes 26 and 27 into receiving or heavy efflux tank 28. If necessary or desirable in order to expedite displacement, after introduction of the displacing liquid into tower 16, slight pressure may be applied to the tower, above the level of its contents, by means of valve-controlled air line 29 provided with valved vent 30. The differential or displacement pressure should preferably be maintained at less than 5 lbs./sq. in. per 1 foot depth of the wax mass, in order to prevent undue compacting of the wax crystals and/or distortion of the interface between the mother liquor and the displacing liquid. When substantially all of the oil and solvent (heavy efflux) has been displaced from the wax mass into receiving tank 28, as evidenced by a marked change in gravity or other critical property of the liquid issuing from the tower 16, the liquid thereafter withdrawn from the tower is diverted into receiving or light efflux tank 31 by closing valve-controlled pipe 27 and opening valve-controlled pipe 32. This light efflux will consist primarily of displacing liquid containing residual oil and solvent which has been washed from the wax mass. The displacing or washing operation is preferably continued until the effluent from tower 16 is principally displacing liquid.

At the completion of the displacing or washing operation, the wax mass containing residual displacing liquid is forced upwardly and out of tower 16 through valve-controlled pipe 33 into wax receiving tank 34, by means of brine introduced into the bottom of the tower from brine tank 18. If necessary or desirable, the wax mass contained in tower 16 may be rendered more fluid by the application of steam in the jacket surrounding said tower. The heavy efflux (oil and solvent) in tank 28, the light efflux (oil, solvent and displacing liquid) in tank 31, and the wax containing residual displacing liquid may be withdrawn from their respective receiving tanks by means of valve-controlled pipes 35, 36 and 37 and passed to distilling apparatus (not shown) wherein the solvent, i. e., ethylene dichloride, and the displacing liquid, i. e., naphtha, may be separated and recovered from the oil and wax.

While, in the above instance, I have described the chilling of the solution of oil stock and solvent from the mixing tank 5 as being effected partially in the chiller 14 and partially within the displacement tower 16, I may, if desired, pass the heated solution directly from the mixing vessel 5 to the tower 16 by means of valve-controlled by-pass 38, and effect such chilling entirely within the tower 16, or I may chill the solution entirely in the chiller 14 prior to the introduction thereof into the displacement tower 16. The latter method of operation may be carried out by pumping the heated solution directly from mixing vessel 5 through valve-controlled pipe 13, chiller 14, and valve-controlled pipe 15 into tower 16. In this instance, the chilled mixture is preferably allowed to remain in a quiescent state within tower 16 for a period of, for example, 4 hours, during which time the crystals form an agglomerate mass having appreciable mechanical strength while still retaining a high degree of free space thruout which the mother liquor is distributed. Due to the gravity differential between the wax and mother liquor a certain amount of upward settling of the former occurs, so that at the end of the quiescent period a lower layer of oil solution relatively free of crystalline wax is present, which may be of the order of 30% of the volume of the total charge. This layer is drawn off from the bottom and at the same time the wax mass settles until, upon completion of the removal of the oil solution, the bottom of the wax mass rests upon the screen. If desired, displacing liquid may be introduced above the chilled mixture contained in the tower, prior to the withdrawal of the layer of oil solution from the bottom thereof. The displacement step is then carried on as above described.

The following tables will serve to illustrate the results which may be obtained when operating in accordance with the general procedure described above. For brevity, the stocks treated in the examples will be defined as follows:

|  | S. U. viscosity | | A. P. I. gravity 60° F. |
|---|---|---|---|
|  | 100° F. | 210° F. | |
| East Texas paraffin distillate | Seconds 64 | Seconds | Degrees 30.8 |
| East Texas intermediate distillate | | 54-62 | 25.5-24.8 |
| East Texas petrolatum stock | | 69-74 | 29.1-27.5 |

The terms "East Texas Intermediate Heavy Efflux" and "East Texas Petrolatum Stock Heavy Efflux" refer to stocks from which a portion of the wax has been removed by a previous displacement dewaxing treatment. It is to be understood that the examples given herein are merely for purposes of illustration, and that my invention is in no wise limited thereto but may be employed in the treatment of a wide variety of wax-bearing stocks from sources other than East Texas crude oil.

In the examples, hereinafter given, the gravities expressed are to be understood to be A. P. I. gravities at 60° F. For instance, when the expression "89° naphtha" is employed, it is to be understood to mean naphtha having an A. P. I. gravity (at 60° F.) of 89 degrees.

TABLE I

*Downward displacement*

| | Example— | | | | |
|---|---|---|---|---|---|
| | 1 | 2 | 3 | 4 | 5 |
| Stock: | | | | | |
| Source | E. Texas int. dist. | E. Texas pffn. dist. | E. Texas pet. stock. | E. Texas int. dist. | E. Texas pet. stock. |
| Pour test | 120° F. | 80° F. | 135° F. | 120° F. | 135° F. |
| Solvent | Ethylene dichloride. | 89° naphtha. | Ethylene dichloride. | 89° naphtha. | Butane. |
| Solution of stock+solvent: | | | | | |
| Percent by volume of solvent | 60 | 65 | 87 | 75 | 85. |
| Heat in mixer to | 120° F. | 100° F. | 120° F. | 100° F. | 100° F. |
| Method of chilling stock-solvent solution. | All outside of displac. tower. | All within displac. tower. | All outside of displac. tower. | All outside of displac. tower. | All outside o displac. tower. |
| Chilling: | | | | | |
| Chilled to— | | | | | |
| Outside tower | 65° F. | None. | 65° F. | 32° F. | 8° F. |
| Within tower | None. | 32° F. | None. | None. | None. |
| Chilling rate (° F./hour): | | | | | |
| Outside tower | 149 | | 4 | 4 | 2.5. |
| Within tower | | 8 | | | |
| Displacement: | | | | | |
| Displacing liquid | Wax saturated 50° naphtha. | 89° naphtha. | Wax saturated 50° naphtha. | 89° naphtha. | Butane. |
| Vol. of displacing liquid used based on charge. | 36% | 40% | 44% | 40% | 55%. |
| Temp. of displacement | 65° F. | 32° F. | 65° F. | 32° F. | 8° F. |
| Specific gravity of mother liquor at displacing temperature. | 1.13 | 0.73 | 1.23 | 0.73 | 0.65. |
| Viscosity of mother liquor at displacing temp. (centipoises). | 2.1 | 0.67 | 1.13 | 0.53 | 0.31. |
| Specific gravity of displacing liquid at displacing temp. | 0.8 | 0.66 | 0.80 | 0.66 | 0.61. |
| Viscosity of displacing liquid at displacing temp. (centipoises). | 0.8 | 0.32 | 0.8 | 0.32 | 0.24. |
| Products: | | | | | |
| Wax— | | | | | |
| Percent yield based on stock | 11.0 | 5.7 | 33.0 | 11.3 | 49.4. |
| Per cent oil in wax | 1.0 | 2.0 | 0.3 | 1.0 | 0.4. |
| Melting point of wax | 152° F. | 145° F. | 152° F. | 153° F. | 146° F. |
| Oil— | | | | | |
| Per cent yield based on stock | 89.0 | 94.3 | 67.0 | 88.7 | 50.6. |
| Pour test | 75° F. | 65° F. | 75° F. | 65° F. | 65° F. |

TABLE II

*Downward displacement*

| | Example— | | | | |
|---|---|---|---|---|---|
| | 6 | 7 | 8 | 9 | 10 |
| Stock: | | | | | |
| Source | E. Texas int. dist. | E. Texas int. dist. | E. Texas int. dist. | E. Texas int. dist. | E. Texas int. dist. |
| Pour test | 120° F. | 120° F. | 120° F. | 120° F | 120° F. |
| Solvent | 75% ethylene dichloride; 25% 88° naph. | Ethylene dichloride. | 35% acetone; 65% benzol. | 89° naphtha. | Ethylene dichloride. |
| Solution of stock+solvent: | | | | | |
| Percent by volume of solvent | 55 | 60 | 60 | 75 | 60. |
| Heat in mixer to | 110° F. | 118° F. | 110° F. | 60° F. | 118° F. |
| Method of chilling stock-solvent solution. | Partial outside. Partial inside displac. tower. | Partial outside. Partial inside displac. tower. | Partial outside. Partial inside displac. tower. | All outside of displac. tower. | Partial outside. Partial inside displac. tower. |

TABLE II—Continued
Downward displacement

| | Example— | | | | |
|---|---|---|---|---|---|
| | 6 | 7 | 8 | 9 | 10 |
| Chilling: | | | | | |
| Chilled to— | | | | | |
|   Outside tower | 80° F | 80° F | 80° F | 32° F | 80° F. |
|   Within tower | 60° F | 60° F | 60° F | None | 60° F. |
| Chilling rate (° F./hour): | | | | | |
|   Outside tower | 5.5 | 6.6 | 6.9 | 3.3 | 6.6. |
|   Within tower | 1.8 | 2.5 | 2.4 | | 2.5. |
| Displacement: | | | | | |
| Displacing liquid | 88° naph | Water white dist. | 88° naph | 89° naph | Ether. |
| Vol. of displacing liquid used based on charge. | 35% | 55% | 35% | 25% | 35%. |
| Temp. of displacement | 60° F | 60° F | 60° F | 32° F | 60° F. |
| Specific gravity of mother liquor at displacing temperature. | 1.03 | 1.13 | 0.876 | 0.72 | 1.13. |
| Viscosity of mother liquor at displacing temp. (centipoises). | 2.4 | 2.2 | 1.6 | 0.53 | 2.2. |
| Specific gravity of displacing liquid at displacing temp. | 0.643 | 0.813 | 0.643 | 0.66 | 0.72. |
| Viscosity of displacing liquid at displacing temp. (centipoises). | 0.27 | 1.05 | 0.27 | 0.32 | 0.24. |
| Products: | | | | | |
| Wax— | | | | | |
|   Percent yield based on stock | 7.0 | 9.2 | 8.1 | 11.4 | 10.1. |
|   Percent oil in wax | 2.0 | 2.4 | 0.22 | 1.7 | 0.4. |
|   Melting point of wax | 154° F | 153° F | 158° F | 154° F | 152° F. |
| Oil— | | | | | |
|   Percent yield based on stock | 93 | 90.8 | 91.9 | 88.6 | 89.9. |
|   Pour test | | | | | |

TABLE III
Downward displacement

| | Example— | | | | |
|---|---|---|---|---|---|
| | 11 | 12 | 13 | 14 | 15 |
| Stock: | | | | | |
| Source | E. Texas pffn. dist. 40–60% cut. | E. Texas int. hy. efflux. | E. Texas pffn. dist. 60–80% cut. | E. Texas int. dist. | E. Texas pet stock. |
| Pour test | 60° F | | 75° F | 120° F | 135° F. |
| Solvent | Ethylene dichloride. | Ethylene dichloride. | Ethylene dichloride. | 35% acetone, 65% benzol. | Ethylene dichloride. |
| Solution of stock+solvent: | | | | | |
| Per cent by vol. of solvent | 60 | 75 | 71 | 60 | 88. |
| Heat in mixer to | 83° F | 76° F | 110° F | | 120° F. |
| Method of chilling stock-solvent solution | All outside of displac. tower. | Partial outside. Partial inside displac. tower. | Partial outside. Partial inside displac. tower. | All out of displac. tower. | All out of displac. tower. |
| Chilling: | | | | | |
| Chilled to— | | | | | |
|   Outside tower | 35° F | 35° F | 30° F | 60° F | 65° F. |
|   Within tower | None | 0° F | 0° F | None | None. |
| Chilling rate (° F./hour): | | | | | |
|   Outside tower | 6.1 | 9.1 | 7.3 | 2.9 | 2.7. |
|   Inside tower | | 0.85 | 0.92 | | |
| Displacement: | | | | | |
| Displacing liquid | Special naphtha. | 88° naphtha. | Special naphtha. | 15% benzol, 85% acetone. | Special naphtha. |
| Vol. of displacing liquid used based on charge. | 40% | 47% | 25% | 77% | 40%. |
| Temp. of displacement | 35° F | 0° F | 0° F | 60° F | 65° F. |
| Specific gravity of mother liquor at displacing temperature. | 1.13 | 1.23 | 1.20 | 0.876 | 1.24. |
| Viscosity of mother liquor at displacing temp (centipoises). | 2.0 | 3.0 | 2.8 | 1.6 | 1.1. |
| Specific gravity of displacing liquid at displacing temp. | 0.78 | 0.67 | 0.80 | 0.81 | 0.8. |
| Viscosity of displacing liquid at displacing temp. (centipoises). | 1.03 | 0.40 | 1.6 | 0.37 | 0.8. |
| Products: | | | | | |
| Wax— | | | | | |
|   Per cent yield based on stock | 2.7 | 7.6 | 14.9 | 8.1 | 26.6 |
|   Per cent oil in wax | 5.7 | 2.3 | 0.54 | 0.7 | 2.0. |
|   Melting point of wax | 123° F | 120° F | 118° F | 155° F | 151° F. |
| Oil— | | | | | |
|   Per cent yield based on stock | 97.3 | 92.4 | 86.7 | 91.9 | 73.4. |
|   Pour test | | | | | |

TABLE IV
Downward displacement

| | Example— | | | | |
|---|---|---|---|---|---|
| | 16 | 17 | 18 | 19 | 20 |
| Stock: | | | | | |
| Source | E. Texas pet. stock. | E. Texas pet. stock hy. efflux. | E. Texas pet. stock hy. efflux. | E. Texas pffn. dist. 60–80% cut. | E. Texas int. dist. |
| Pour test | 135° F | | | 75° F | 120° F. |

TABLE IV—Continued
Downward displacement

| | Example— | | | | |
|---|---|---|---|---|---|
| | 16 | 17 | 18 | 19 | 20 |
| Solvent | Ethylene dichloride. | Ethylene dichloride. | Ethylene dichloride. | Ethylene dichloride. | Ethylene dichloride. |
| Solution of stock+solvent: | | | | | |
|   Percent by vol. of solvent | 80 | 89.5 | 87.4 | 70 | 75. |
|   Heat in mixer to | 120° F | 79° F | 90° F | 95° F | 116° F. |
| Method of chilling stock-solvent solution. | All outside of displac. tower. | Partial outside. Partial inside displac. tower. | Partial outside. Partial inside displac. tower. | All outside of displac. tower. | Partial outside. Partial inside displac. tower. |
| Chilling: | | | | | |
|   Chilled to— | | | | | |
|     Outside tower | 70° F | 35° F | 35° F | 0° F | 35° F. |
|     Within tower | None | 5° F | 5° F | None | 9° F. |
|   Chilling rate (° F./hour): | | | | | |
|     Outside tower | 3.7 | 8 | 8.5 | 7.1 | 4.7. |
|     Inside tower | | 0.9 | | | 3.0. |
| Displacement: | | | | | |
|   Displacing liquid | 88° naphtha | 88° naphtha | 88° naphtha | Special naphtha | Butane. |
|   Vol. of displacing liquid used based on charge. | 45% | 32% | 33% | 25% | 60%. |
|   Temp. of displacement | 70° F | 5° F | 5° F | 0° F | 9° F. |
|   Specific gravity of mother liquor at displacing temperature. | 1.21 | 1.28 | 1.28 | 1.20 | 1.22. |
|   Viscosity of mother liquor at displacing temp. (centipoises). | 1.3 | 1.7 | 1.9 | 2.9 | 2.7. |
|   Specific gravity of displacing liquid at displacing temp. | 0.64 | 0.67 | 0.67 | 0.80 | 0.61. |
|   Viscosity of displacing liquid at displacing temp. (centipoises). | 0.25 | 0.38 | 0.38 | 1.6 | 0.24. |
| Products: | | | | | |
|   Wax— | | | | | |
|     Percent yield based on stock | 17.5 | 16.4 | 19.9 | 13.3 | 12.2. |
|     Percent oil in wax | 1.2 | 0.3 | 0.1 | 1.0 | 0.6. |
|     Melting point of wax | 157° F | 121° F | 120° F | 118° F | 146° F. |
|   Oil— | | | | | |
|     Percent yield based on stock | 82.5 | 83.6 | 80.1 | 86.7 | 87.8. |
|     Pour test | | | | | |

Figure 2:
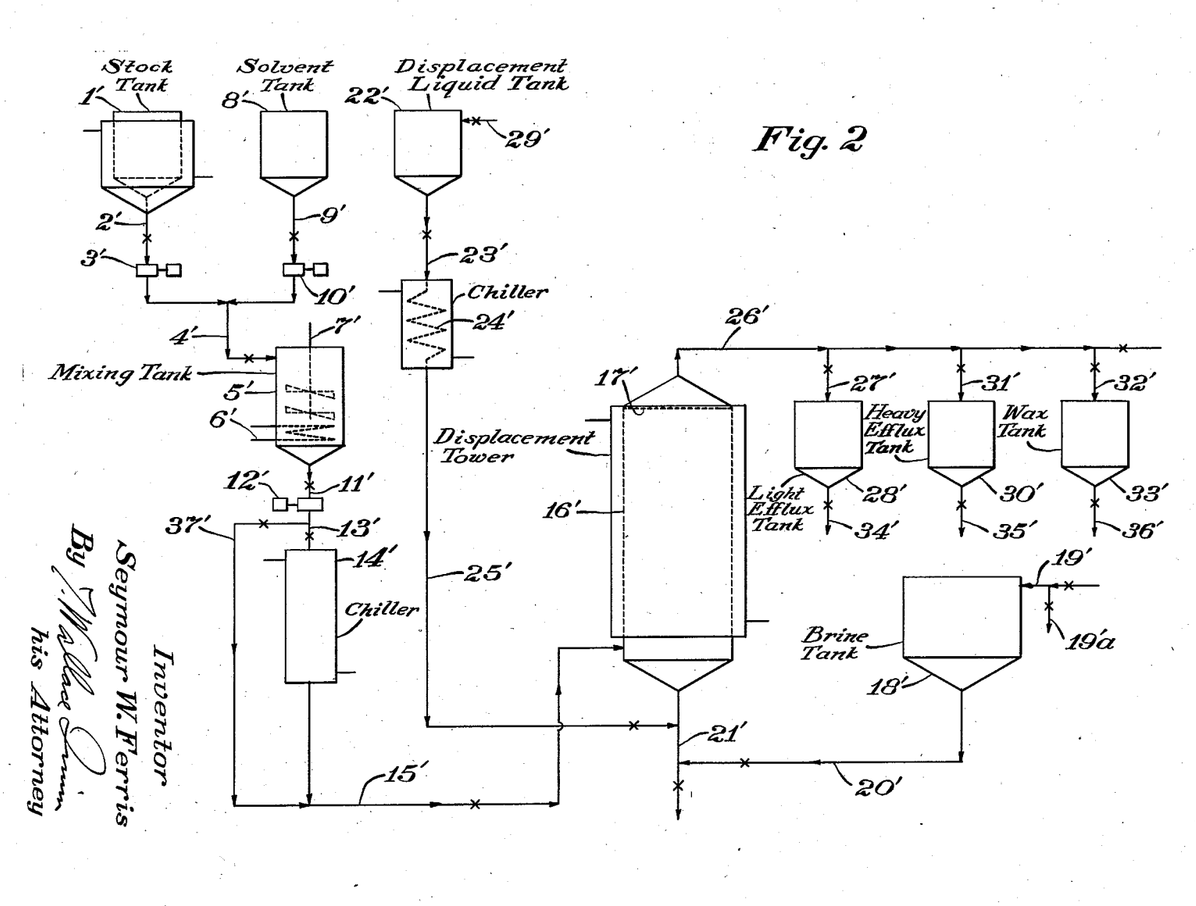

Referring now to Fig. 2 of the drawings, which illustrate apparatus suitable for carrying out the separation of oil-wax mixtures by upward displacement:

From a steam jacketed stock tank 1', 40 parts, for example, of an East Texas intermediate distillate, having a pour test of 120° F., is withdrawn through valve-controlled pipe 2', and pumped by pump 3' through valve-controlled pipe 4', into mixing tank 5', provided with heating coil 6' and stirrer 7'. Simultaneously or subsequently 60 parts, for example, of ethylene dichloride is withdrawn from solvent tank 8' by means of valve-controlled pipe 9', and pumped by pump 10' through valve-controlled pipe 4' into mixing tank 5'. Herein the solvent and distillate containing wax is agitated at a temperature of, for example, 120° F., until a homogeneous solution is obtained. The resulting solution is passed from the mixing tank 5' by means of valve-controlled pipe 11', and is pumped by pump 12' through a chilling device 14', wherein the solution is cooled until the temperature is of the order of, for example, 65° F., and the desired quantity of wax has crystallized. This oil-wax-solvent mixture is passed from the chiller 14' by means of valve-controlled pipe 15', into the brine jacketed displacement tower 16', up to the level of screen 17'. The chilled mixture is allowed to remain in a quiescent state within tower 16' for a period of, for example, 6 hours, during which time the wax crystals form an agglomerate mass of appreciable mechanical strength while still retaining a high degree of free space or porosity. At the completion of the quiescent period, 50 parts of a displacing liquid, for example, ethylene dichloride, is passed from the displacement liquid tank 22' through valve-controlled pipe 23', cooled to about 65° F. in cooling coil 24', and introduced into the displacement tower 16' by means of valve-controlled pipe 25', below the surface of the chilled oil-wax-solvent mixture contained therein. The displacing liquid is introduced in such a manner as to prevent substantial disturbance of the chilled mixture from which the oil and solvent are to be displaced. Oil and solvent from the wax mass, displaced upwardly by the incoming displacing liquid, is withdrawn from the top of tower 16' and passed through valve-controlled pipes 26' and 27', into receiving or light efflux tank 28'. If necessary or desirable, in order to expedite displacement, slight pressure may be applied to the tower 16', by introducing air, under pressure, above the displacement liquid in tank 22' by means of valve-controlled air line 29'. The differential or displacement pressure should preferably be maintained at less than 5 lbs./sq. in. per 1 foot depth of the wax mass, in order to prevent undue compacting of the wax crystals and/or distortion of the interface between the mother liquor and the displacing liquid. When substantially all of the oil and solvent (light efflux) has been displaced from the wax mass into receiving tank 28', as evidenced by a marked change in gravity or other critical property of the liquid issuing from the tower 16', the liquid thereafter withdrawn from the tower is diverted into receiving or heavy efflux tank 30' by closing valve-controlled pipe 27' and opening valve-controlled pipe 31'. This heavy efflux will consist primarily of displacing liquid containing residual oil and solvent which has been washed from the wax mass. The displacing or washing operation is preferably continued until the effluent from the tower 16' is principally displacing liquid.

At the completion of the displacing or washing operation, the wax mass containing residual displacing liquid may be withdrawn from the bottom of tower 16' by means of valve-controlled pipe 21', and passed to storage. Or, the wax mass may be heated, by circulating steam through the jacket of tower 16', to render it sufficiently fluid to pass through the screen 17' to suitable storage. In this case, after the wax mass has been rendered fluid, air pressure is applied to brine tank 18' through valve-controlled pipe 19' provided with valved vent 19'a, and brine is forced through valve-controlled pipe 20' and pipe 21' into the tower 16' beneath the wax and solvent contained therein. The fluid mixture is forced upwardly and out of tower 16' through valve-controlled pipes 26' and 32' into wax receiving tank 33'. The light efflux (oil and solvent) in tank 28', the heavy efflux (oil, solvent and displacing liquid) in tank 30', and the wax containing residual displacing liquid may be withdrawn from controlled pipe 15' into tower 16'. The displacement tower 16' may be provided with cooling means, preferably a plurality of vertical tubes (not shown), in addition to or in place of the brine jacket shown.

Instead of the cylindrical, straight walled displacement tower 16' shown in the drawings, I may employ a fully or partially tapered tower, for example such as disclosed in the co-pending application of J. A. Alexander, Serial No. 4158, filed January 30, 1935, now Patent No. 2,079,596. Such improved form of tower aids materially in preventing cracking and channeling of the wax mass during displacement.

The following table will serve to illustrate the results which may be obtained when operating in accordance with the general procedure described above.

TABLE V

*Upward displacement*

|  | Example— | | | | |
|---|---|---|---|---|---|
|  | 21 | 22 | 23 | 24 | 25 |
| Stock: | | | | | |
| Source | E. Texas int. dist. | E. Texas pffn. dist. | E. Texas pffn. dist. | E. Texas pffn. dist. | E. Texas int. wax. |
| Pour test | 115° F | 120° F | | | 139° F. MP. |
| Solvent | Ethylene dichloride. | 89° naphtha | 89° naphtha | 89° naphtha | Ethylene dichloride. |
| Solution of stock+solvent: | | | | | |
| Per cent by vol. of solvent | 80 | 65 | 65 | 65 | 90. |
| Heat in mixer to | 130° F | 76° F | 85° F | 76° F | 140° F. |
| Method of chilling stock-solvent solution. | Partial outside. Partial inside displac. tower. | All outside of displac. tower. | All outside of displac. tower. | All outside of displac. tower. | All within displac. tower. |
| Chilling: | | | | | |
| Chilled to— | | | | | |
| Outside tower | 40° F | 32° F | 32° F | 32° F | None. |
| Within tower | 16° F | None | None | None | 90° F. |
| Chilling rate (°F./hour): | | | | | |
| Outside tower | | 5.3 | 3.4 | 5.3 | 10. |
| Inside tower | 8 | | | | |
| Displacement: | | | | | |
| Displacing liquid | Ethylene dichloride. | Water white dist. | Naphtha and nitrobenzene. | Naphtha and nitrobenzene. | Ethylene dichloride. |
| Vol. of displacing liquid used based on charge. | 108% | | 60% | 30% | 70%. |
| Temp. of displacement | 16° F | 32° F | 32° F | 32° F | 90° F. |
| Specific gravity of mother liquor at displacing temperature. | 1.24 | 0.73 | 0.73 | 0.73 | 1.22. |
| Viscosity of mother liquor at displacing temp. (centipoises). | 2.1 | 0.67 | 0.67 | 0.67 | 0.8. |
| Specific gravity of displacing liquid at displacing temp. | 1.30 | 0.822 | 0.93 | 0.93 | 1.24. |
| Viscosity of displacing liquid at displacing temp. (centipoises). | 1.3 | 1.3 | | | 0.75. |
| Products: | | | | | |
| Wax— | | | | | |
| Per cent yield based on stock. | 13.7 | 6.8 | 7.4 | 8.2 | 62.6. |
| Per cent oil in wax | 2.1 | 2.5 | 1.7 | 1.2 | 0.5. |
| Melting point of wax | | 150° F | 149° F | 150° F | 148° F. |
| Oil (or efflux wax): | | | | | |
| Per cent yield based on stock. | 86.3 | 93.2 | 92.6 | 91.8 | 37.4 (wax). |
| Pour test | 25° F | | | | 126° F. M. P. | their respective receiving tanks by means of valve-controlled pipes 34', 35', and 36', and passed to distilling apparatus (not shown), wherein the solvent and the displacing liquid may be separated and recovered from the oil and wax.

While, in the above instance, I have described the chilling of the solution of oil stock and solvent from the mixing tank 5' as being effected entirely outside of the displacement tower 16', I may, if desired, effect such chilling partially in the chiller 14', and partially in the tower 16', or I may chill the solution entirely in the displacement tower 16'. The latter method of operation may be carried out by pumping the heated solution directly from mixing vessel 5' through valve-controlled by-pass 37' and valve-controlled pipe 15' into tower 16'.

While the examples given above illustrate, in general, the results which may be obtained by displacement following a single crystallization of wax from solution, I may employ a series of two or more crystallizations, at successively lower temperatures, with the removal of crystallized wax after each chilling and displacement.

For example, 55 parts by volume of East Texas paraffin distillate were mixed with 45 parts by volume of ethylene dichloride, and heated with agitation, to about 110° F., until substantially complete solution was obtained. The solution was then chilled to 63° F., passed into a displacing tower, and the mother liquor was displaced downwardly from the crystalline wax mass with 45 parts by volume of special naphtha (based on the volume of the mixture charged). The resulting wax, after removal of the residual displacing naphtha, amounted to 4.8% of the stock charged, and had an oil content of 0.6% and a melting point of 152° F.

The efflux mother liquor from the first displacement was then chilled to 41° F., charged to a second displacement tower, and the mother liquor was again displaced downwardly from the crystalline wax with 45 parts by volume of special naphtha (based on the volume of the mixture charged). The resulting wax, after removal of the residual displacing naphtha, amounted to 3.44% of the stock charged, and had an oil content of 3.3% and a melting point of 127° F. The final mother liquor, after removal of solvent therefrom by distillation, yielded 91.8% of oil (based on the volume of the stock charged) having a pour test of about 40° F. If it is found desirable to produce oils of very low pour test, i. e., 10° F. or lower, displacement may be effected in one or more stages at temperatures of the order of 0° F. or lower.

In some instances I may dilute the efflux mother liquor from the initial displacement step with additional quantities of solvent prior to subjecting such liquor to further chilling and displacement, in order to maintain the crystalline wax resulting from the chilling at the optimum concentration for displacement.

It will be seen, in accordance with the examples herein given, that by my process I am able to separate a mixture containing hydrocarbons of different fusibility into fractions respectively more fusible, i. e., the oil and/or soft wax, and less fusible, i. e., the hard wax, in a practical and economical manner not heretofore known.

In addition to the solvents and displacing or wash liquids disclosed hereinabove, there may also be employed the conventional dewaxing solvents such as ketones, alcohols, esters, ethers, halogenated hydrocarbons and liquefied normally gaseous hydrocarbons. The light hydrocarbons such as ethane, propane, butane and pentane and mixtures thereof, are of particular utility in my process, by reason of their very low viscosities and gravities which make them especially desirable as displacing liquids. During the displacement of mother liquor from the wax mass, the compacting of the wax crystals may be greatly reduced and the rate of displacement substantially increased by employing displacing liquids having viscosities of the order of those of the liquefied normally gaseous hydrocarbons.

In operating my process I take advantage of several physical properties which vary through rather wide limits. For example, it has already been pointed out that advantage is taken of differences in specific gravity of mother liquor and displacing liquid respectively to maintain a horizontal interface therebetween during displacement. If the wax-containing mixture be of such a character that relatively rapid rates of displacement are feasible, it becomes highly desirable to maintain a very considerable gravity differential between mother liquor and displacing liquid, for the reason that, in general, the tendency towards disruption of the interface and/or channeling is greater when relatively high rates of displacement are employed, and gravity differentials of considerable magnitude tend to prevent such disruption or channeling.

When, for example, ethylene dichloride is employed in making up the crystallizing solution or mother liquor and butane is used as the displacing liquid, it is possible to obtain a specific gravity differential as high as 0.65 at the temperature of displacement. Still higher gravity differentials, i. e., of the order of about 1.0 to 2.0 or higher, may be obtained by employing various other solvents or mixtures of solvents, among which may be mentioned the following:

| Solvent | Specific gravity/ 60° F. |
|---|---|
| Chloroform | 1.50 |
| Carbon tetrachloride | 1.60 |
| Acetone chloride | 1.83 |
| Pentachloro-ethane | 1.83 |
| Methylene bromide | 2.50 |
| Acetylene tetra bromide | 2.97 |
| Methylene iodide | 3.33 |

The relationship between the specific gravity of the mother liquor, the displacing liquor and the solid wax crystals is of considerable importance in the efficient operation of my process. Wax from some wax-containing stocks, for example, when crystallized from solution produce crystals which are small and soft, and tend to pack in a relatively dense layer against the displacement tower screen, thus requiring the use of excessive pressure to continue the displacement and increasing the danger of channeling of the displacing liquid. In such a case the tendency to pack against the screen may be minimized by employing a crystallizing solvent or mixture of solvents of very high gravity, such as those mentioned above. It will be seen that the higher the gravity of the mother liquor, with respect to the gravity of the wax crystals, the greater will be the buoyant force effective upon the crystals, and this buoyant force will tend to lift the crystals from the screen and therefore reduce the tendency for them to pack against the screen.

Likewise, the situation is somewhat similar with respect to the gravity differential between the wax crystals and the displacing liquid. After the displacement step has proceeded for a time, a portion of the wax mass will consist of washed wax crystals containing displacing liquid. If the displacing liquid (in the case of downward displacement) be of considerably lower specific gravity than that of the crystals, there is a tendency for the washed crystals to settle and pack toward the receding interface of the displacing liquid. If, however, the specific gravity of the displacing liquid be adjusted so that it is equal or even greater than that of the wax crystals, the tendency of the crystals to pack is largely eliminated. The specific gravities of the various waxes usually fall within the range of from about 0.90 to 0.94 at 60° F., although some special waxes or wax fractions may be found within the range of, for example, 0.75 to 0.95 at 60° F. The following values are typical of the specific gravities of waxes obtained from various oil fractions from East Texas crude oil.

| Stock | Specific gravity of wax/ 60° F. |
|---|---|
| East Texas paraffin distillate (40%–60% cut) | 0.913 |
| East Texas intermediate distillate | 0.931 |
| East Texas intermediate distillate (efflux) | 0.929 |
| East Texas petrolatum stock | 0.935 |
| East Texas petrolatum stock (efflux) | 0.929 |

Furthermore, the viscosity of the mother liquor and the displacing liquid must also be taken into consideration, for the reason that the average distance between crystals is very small, and the greater the viscosity of the liquid which must pass through these orifices, the greater will be the force required to effect displacement, and the greater will be the compressive forces acting upon the crystals of the wax mass. Therefore, it is particularly desirable to employ displacing liquids of relatively low viscosity, i. e., of the order of 0.1 to 5 centipoises, and preferably of the order of 0.1 to 2.0 centipoises, at the temperature of displacement.

It is to be understood that it is not possible to specify the optimum conditions for displacement, inasmuch as these conditions vary with the different wax-containing stocks to be handled. Thus, if the wax-containing stock is such that the crystals of wax are large and relatively hard, displacement may be carried out at relatively high rates with little concern as to the packing of wax against the screen or to undue compression of the wax mass. In this case it is advisable to employ as high a gravity differential as is possible in order that the rapidly advancing interface between displacing liquid and mother liquor may be kept horizontal. If, on the other hand, the crystals are soft and apt to pack, it is desirable that a high gravity differential between mother liquor and wax be employed, in order to reduce the tendency of the wax to pack against the screen, and, in addition, the displacing liquid is preferably of relatively high gravity to prevent the washed wax from being unduly compacted. In this case, the gravity differential between mother liquor and displacing liquid is somewhat less than that in the preceding instance. It is desirable that the viscosity of both mother liquor and displacing liquid be relatively low, although it may not be possible in every case to employ either the lowest viscosity of mother liquor or the lowest viscosity of displacing liquid, and still retain the desired gravity differential between the two liquid phases and the wax.

Furthermore, the displacing liquids employed in my process may be saturated with wax, preferably oil-free, prior to their use in the displacing step to reduce solvent power thereof for wax. Or, the displacing liquid may contain a suspension or dispersion of fine wax particles which will tend to fill incipient cracks or channels which may develop in the wax mass during the displacing operation.

The volume of displacing or washing liquid employed in removing the mother liquor from the wax mass may be of the order of from 20% to 100%, or more, by volume of the oil-wax-solvent mixture charged to the displacing tower. The utilization of small volumes of displacing liquid, i. e., less than 100% by volume of the charge, is disclosed and claimed in the co-opending application of J. A. Alexander, Serial No. 4,159, filed January 30, 1935, now Patent No. 2,083,547.

The percent oil in wax, as herein referred to, was determined on the weight percentage basis, in accordance with the following method:

25 gm. of wax (M. P. 120° F. or higher) or 35 gm. of wax (M. P. less than 120° F.) is heated with sufficient ethylene dichloride to make up a homogeneous solution of approximately 500 cc., and the exact temperature and volume of the solution is noted. This solution is then cooled, with stirring, to a temperature of from 0° F. to 6° F., and the resulting wax slurry is run onto a paper filter and allowed to filter by gravity. A quantity of the filtrate (100 cc.) is placed in a tared evaporating dish, the exact volume and temperature being noted. The ethylene dichloride is then evaporated off at a temperature of from 115° F. to 120° F., and any residual solvent is removed by subjecting the heated dish and contents to reduced pressure (25 m/m.) for a period of 15 minutes. Any ethylene dichloride vapors remaining are then swept out by a current of gaseous carbon dioxide, and the dish is cooled and weighed. From the weight of the oil thus determined, the quantity of wax taken as a sample, the volume of the solvent employed, temperature and volume corrections being made, the percentage by weight of the oil in the wax may readily be calculated. The method above outlined is considerably more accurate and stringent than the conventional "Expressible oil and moisture" test known to those skilled in the art. Depending upon the character of the wax, from 1% to 15% or more of oil may be present in the wax and still be undetectable by the latter test.

For brevity, in the appended claims, the terms "solvent liquid" and "displacing liquid" are to be understood to comprehend those compounds in which oil is readily miscible and wax is relatively immiscible at the temperatures employed in the separation of the oil and the wax. Also, the term "wax mass" as employed herein and in the appended claims, comprehends a porous mass or body of wax crystals containing oil or solvent distributed therethrough.

What I claim is:

1. A process for dewaxing waxy oil which comprises chilling waxy oil to congeal the same and leaching the congealed waxy oil with a solvent which has a relatively high solvent power for the oil but a relatively poor solvent power for the wax, the temperature of leaching being sufficiently low to maintain said wax in a solid condition, said solvent being of a higher specific gravity than said wax and separating said wax from the oil solvent solution.

2. A method as in claim 1 in which the solvent comprises a chlorinated carbon containing compound which has a high solvent power for oil and a low solvent power for wax at low temperatures, said chlorinated carbon containing compound being fluid at the dewaxing temperature and having a specific gravity greater than the specific gravity of the wax desired to be separated from the waxy oil.

3. The process of separating a hydrocarbon oil-wax mixture into solid constituents and liquid constituents, which comprises producing a wax-containing mixture, cooling said mixture to effect crystallization of wax to form a wax mass containing less than substantially 10% by volume of solid wax and displacing from said wax mass, without substantial agitation thereof and under a low differential pressure, the liquid constituents of said mass with a displacing liquid, while maintaining a substantially horizontal interface between said displacing liquid and the liquid constituents being displaced.

4. The process of separating a hydrocarbon oil-wax mixture into solid constituents and liquid constituents, which comprises producing a wax-containing mixture, cooling said mixture to effect crystallization of wax to form a wax mass containing from about 1% to about 6% by volume of solid wax and displacing from said wax mass, without substantial agitation thereof and under a low differential pressure, the liquid constituents of said mass with a displacing liquid, while maintaining a substantially horizontal interface between said displacing liquid and the liquid constituents being displaced.

5. The process of separating a hydrocarbon oil-wax mixture into solid constituents and liquid constituents, which comprises diluting said mixture with a solvent liquid, cooling the diluted mixture to effect crystallization of wax to form a wax mass containing less than substantially 10% by volume of solid wax and displacing from said wax mass, without substantial agitation thereof and under a low differential pressure, the liquid constituents of said mass with a displacing liquid, while maintaining a substantially horizontal interface between said displacing liquid and the liquid constituents being displaced.

6. The process of separating a hydrocarbon oil-wax mixture into solid constituents and liquid constituents, which comprises producing a wax-containing mixture, cooling said mixture to effect crystallization of wax to form a wax mass containing less than substantially 10% by volume of solid wax and displacing from said wax mass, without substantial agitation thereof and under a differential pressure of less than substantially 5 lbs./sq. in. per one foot depth of mass, the liquid constituents of said mass with a displacing liquid, while maintaining a substantially horizontal interface between said displacing liquid and the liquid constituents being displaced.

7. The process of separating a hydrocarbon oily wax mixture into solid constituents and liquid constituents, which comprises producing a wax-containing mixture, cooling said mixture to effect crystallization of wax to form a wax mass containing from about 1% to about 6% by volume of solid wax and displacing from said wax mass, without substantial agitation thereof and under a differential pressure of less than substantially 5 lbs./sq. in. per one foot depth of mass, the liquid constituents of said mass with a displacing liquid, while maintaining a substantially horizontal interface between said displacing liquid and the liquid constituents being displaced.

8. The process of separating a hydrocarbon oil-wax mixture into solid constituents and liquid constituents, which comprises producing a wax-containing mixture, cooling said mixture to effect crystallization of wax to form a wax mass containing from about 2.5% to about 4.5% by volume of solid wax and displacing from said wax mass, without substantial agitation thereof and under a differential pressure of less than 5 lbs./sq. in. per one foot depth of mass, the liquid constituents of said mass with a displacing liquid, while maintaining a substantially horizontal interface between said displacing liquid and the liquid constituents being displaced.

9. The process of separating a hydrocarbon oil-wax mixture into solid constituents and liquid constituents, which comprises producing a wax-containing mixture, cooling said mixture to effect crystallization of at least a portion of the wax, said crystalline wax being less than substantially 10% by volume of the mixture, forming the crystalline wax into a wax mass of substantial uniformity and containing the major portion of the liquid constituents of the mixture distributed therethrough, and displacing from said mass, wthout substantial agitation thereof and under a low differential pressure, the liquid constituents of said mass with a displacing liquid, while maintaining a substantially horizontal interface between said displacing liquid and the liquid constituents being displaced.

SEYMOUR W. FERRIS.